United States Patent
Oho et al.

(10) Patent No.: US 11,054,805 B2
(45) Date of Patent: Jul. 6, 2021

(54) DISPLAY DEVICE

(71) Applicant: FANUC CORPORATION, Yamanashi (JP)

(72) Inventors: Yusaku Oho, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 232 days.

(21) Appl. No.: 16/378,602

(22) Filed: Apr. 9, 2019

(65) Prior Publication Data
US 2019/0324425 A1 Oct. 24, 2019

(30) Foreign Application Priority Data

Apr. 24, 2018 (JP) .............................. JP2018-082946

(51) Int. Cl.
*G05B 19/4093* (2006.01)
*G05B 19/19* (2006.01)
*B23B 27/22* (2006.01)

(52) U.S. Cl.
CPC ........ *G05B 19/40937* (2013.01); *B23B 27/22* (2013.01); *G05B 19/19* (2013.01);
(Continued)

(58) Field of Classification Search
CPC .............. G05B 19/40937; G05B 19/19; G05B 2219/31472; G05B 2219/45136;
(Continued)

(56) References Cited

U.S. PATENT DOCUMENTS 6,889,096 B2 * 5/2005 Spriggs ................. G05B 15/02
340/3.71
2017/0108846 A1 * 4/2017 Sannomiya ........ B23Q 15/0075

FOREIGN PATENT DOCUMENTS

JP 5033929 B1 9/2012
JP 5599523 B1 10/2014
(Continued)

OTHER PUBLICATIONS

An Office Action; "Notice of Reasons for Refusal," mailed by the Japanese Patent Office dated Jul. 21, 2020, which corresponds to Japanese Patent Application No. 2018-082946 and is related to U.S. Appl. No. 16/378,602; with English language translation.

*Primary Examiner* — Christopher E. Everett
(74) *Attorney, Agent, or Firm* — Studebaker & Brackett PC

(57) ABSTRACT

A display device acquires and displays information on a machine tool that includes a spindle for relatively rotating workpiece and a cutting tool and feed axes for relatively feeding the workpiece and the cutting tool and that performs machining on the workpiece while making the cutting tool and the workpiece swing relatively, and includes: a first information display unit that displays first information indicating a position to which the cutting tool is relatively fed with respect to the workpiece; a second information display unit that displays second information indicating a relationship between the phase of the spindle and the positions of the feed axes; and a range selection unit that selects part of the first information as a selection range, and the second information display unit changes the display range of the second information such that the display range corresponds to the selection range selected by the range selection unit.

8 Claims, 5 Drawing Sheets

(52) U.S. Cl.
CPC ........... *G05B 2219/31472* (2013.01); *G05B 2219/36204* (2013.01); *G05B 2219/45136* (2013.01)

(58) Field of Classification Search
CPC ........... G05B 2219/36204; G05B 2219/35492; G05B 2219/35312; G05B 19/4068; G05B 2219/35349; B23B 27/22; B23B 25/02; B23Q 1/0009
See application file for complete search history.

(56) References Cited

FOREIGN PATENT DOCUMENTS

| | | |
|---|---|---|
| JP | 6001720 B1 | 10/2016 |
| WO | 2015/146945 A1 | 10/2015 |

* cited by examiner

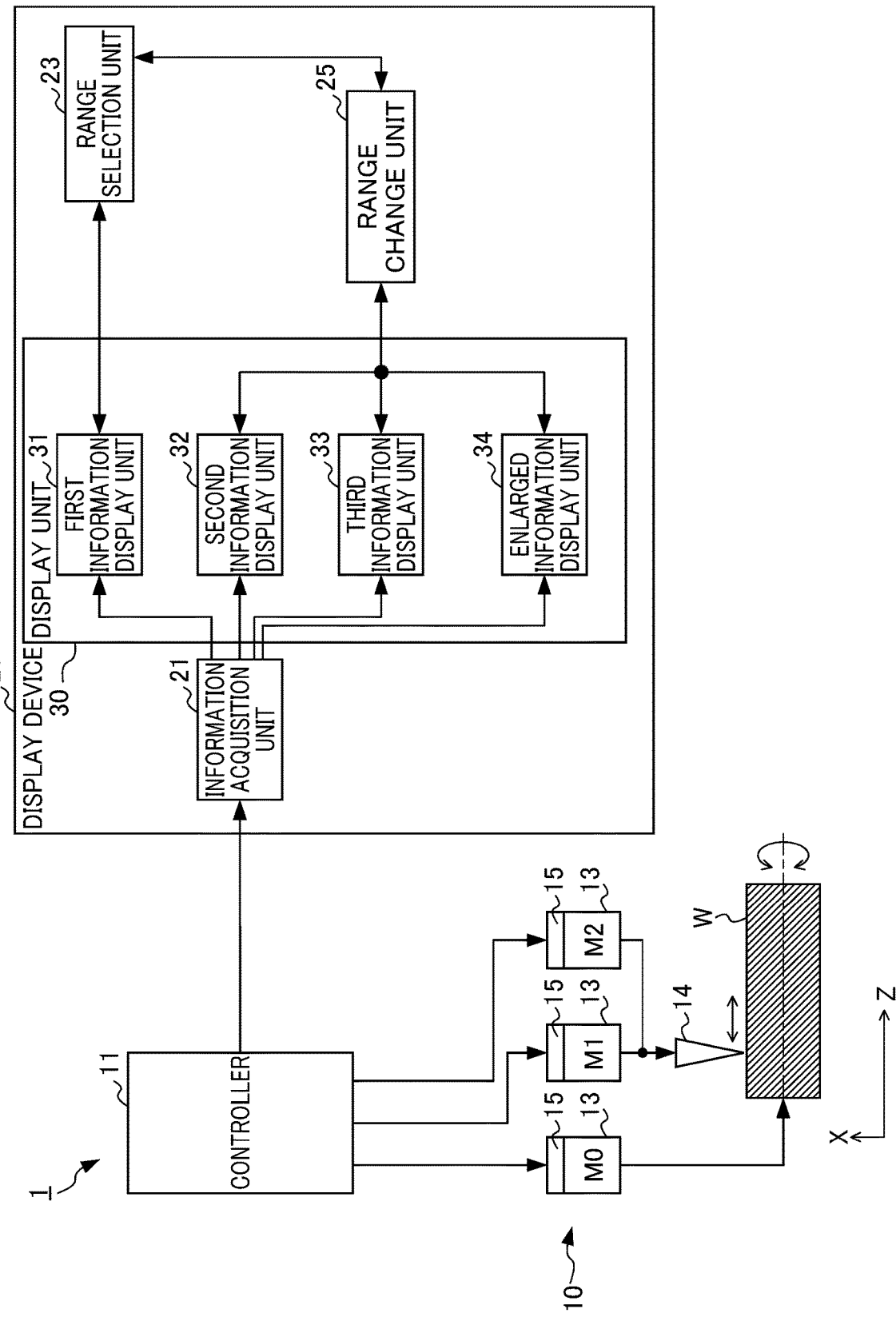

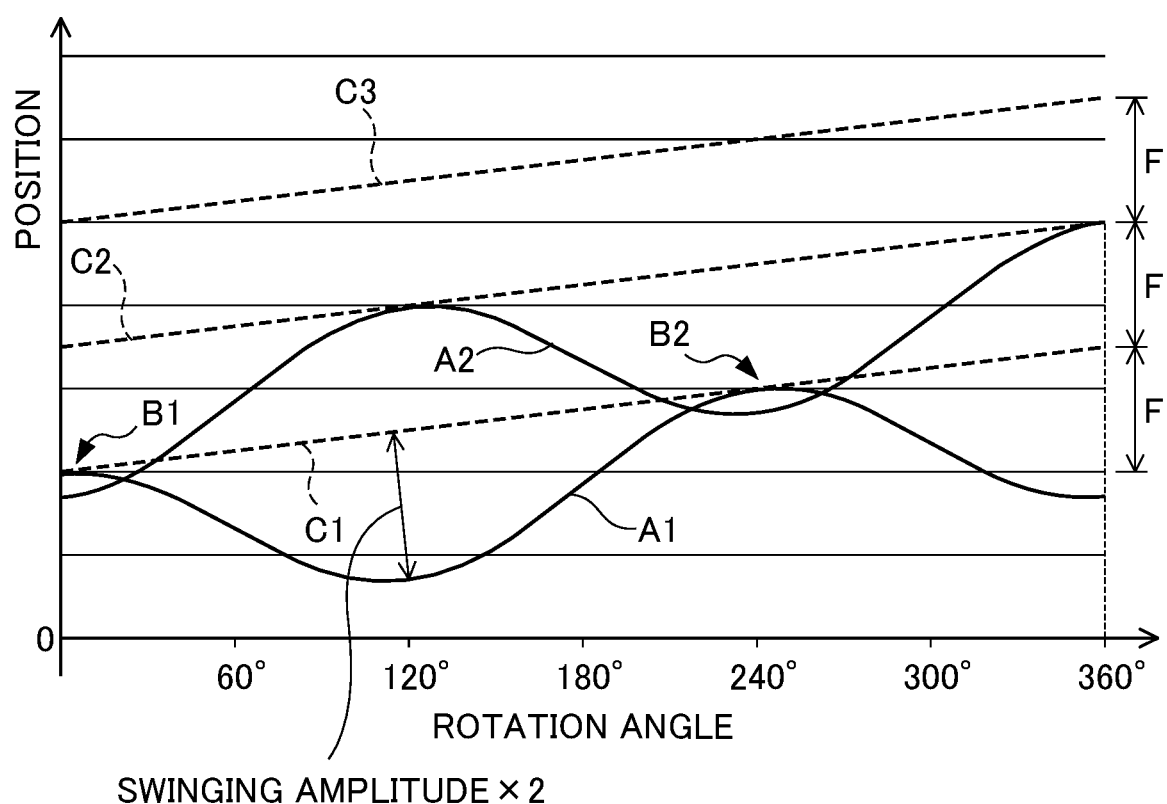

DISPLAY DEVICE

This application is based on and claims the benefit of priority from Japanese Patent Application No. 2018-082946, filed on Apr. 24, 2018, the content of which is incorporated herein by reference.

BACKGROUND OF THE INVENTION

Field of the Invention

The present invention relates to a display device of a machine tool which performs turning on a workpiece by a coordinated operation of a spindle and a feed axis, and more particularly relates to a display device which displays a path of the feed axis of a machine tool that performs swinging cutting.

Related Art

When a workpiece is machined with a cutting tool of a machine tool, if chips are continuously generated, the chips may become entangled in the cutting tool. In such a case, it is necessary to stop the machine tool in order to remove the chips from the cutting tool, and thus it takes much time, with the result that the production efficiency thereof is lowered. Furthermore, the chips may damage the workpiece, and thus the quality of the workpiece may be lowered. In order to avoid such a defect, swinging cutting is known in which the cutting tool and the workpiece are made to swing relatively in the direction of machining, and in which thus the chips are shredded (see, for example/Patent Document 1 and Patent Document 2). The controller of the machine tool which performs the swinging cutting provides a sinusoidal feed command to a servo motor for a feed axis that feeds the cutting tool or the workpiece in the direction of the machining, and thereby makes the cutting tool and the workpiece swing relatively in the direction of the machining. Conventionally, a waveform display device is known which can display, as waveforms, command data that is calculated with a computer numerical controller (CNC) according to a machining program and that is commanded to the servo motors of the individual axes of a machine tool, actual position data that is output from position detection devices included in the individual axes and the like (for example, Patent Document 3).

Patent Document 1: Japanese Patent No. 5033929
Patent Document 2: Japanese Patent No. 5599523
Patent Document 3: Japanese Patent No. 6001720

SUMMARY OF THE INVENTION

In order to shred the chips as intended in the swinging cutting described above, it is necessary to previously determine the frequency, the amplitude and the like of the feed command for using the feed axis to make the cutting tool or the workpiece swing periodically in the direction of the machining of the workpiece. In general, in the computer numerical controller of a machine tool, an NC program which can set machining conditions such as a spindle revolution number and a feedrate and various types of parameters is produced and stored, and the feed command for the swinging operation described above is calculated according to the NC program. Hence, an operator changes the machining conditions and the various types of parameters set in the NC program within the computer numerical controller so as to determine the frequency, the amplitude and the like of the feed command for the swinging operation. In the operation as described above, it is preferably possible to check how the command data and the actual position data for the feed axis that performs the swinging operation are changed according to the change of the machining conditions and the various types of parameters set in the NC program within the computer numerical controller, and the waveform display device as described above is useful. However, it is disadvantageously difficult to determine whether or not the chips can be shredded with the cutting tool only by simply displaying, as a waveform, a chronological change of the command data or the actual position data on the feed axis which performs the swinging operation.

An object of the present invention is to provide a display device with which an operator can visually and easily determine whether or not chips can be shredded in swinging cutting.

(1) A display device (for example, a display device 20 which will be described later) according to the present invention acquires and displays information on a machine tool (for example, a machine tool 10 which will be described later) that includes a spindle (for example, a spindle M0 which will be described later) for relatively rotating a workpiece (for example, a workpiece w which will be described later) and a cutting tool (for example, a cutting tool 14 which will be described later) and at least one feed axis (for example, a feed axis M1, M2 which will be described later) for relatively feeding the workpiece and the cutting tool and that performs machining on the workpiece while making the cutting tool and the workpiece swing relatively, and includes: a first information display unit (for example, a first information display unit 31 which will be described later) that displays first information indicating a position to which the cutting tool is relatively fed with respect to the workpiece; a second information display unit (for example, a second information display unit 32 which will be described later) that displays second information indicating a relationship between the phase of the spindle and the position of the feed axis; and a range selection unit (for example, a range selection unit 23 which will be described later) that selects part of the first information as a selection range, and the second information display unit changes the display range of the second information such that the display range corresponds to the selection range selected by the range selection unit.

(2) The display device described in (1) may further include a range change unit (for example, a range change unit 25 which will be described later) that changes the display range of the second information, and the range selection unit may change the selection range such that the selection range corresponds to the display range of the second information which is changed by the range change unit.

(3) The display device described in (1) may further include a third information display unit (for example, a third information display unit 33 which will be described later) that displays third information indicating a chronological change of the position information, the torque information, the speed information or the acceleration information of the feed axis (M1, M2), the third information display unit may further display the third information or the second information display unit and the third information display unit may switch the second information with the third information so as to display the third information and the third information display unit nay change the display range of the third information such that the display range corresponds to the selection range selected by the range selection unit.

(4) The display device described in (3) may further include a range change unit (for example, a range change unit 25 which will be described later) that changes at least any one of the display range of the second information and the display range of the third information, and the range selection unit may change the selection range such that the selection range corresponds to the display range of the second information or the display range of the third information which is changed by the range change unit.

(5) The display device described in (1) may further include an enlarged information display unit (for example, an enlarged information display unit 34 which will be described later) that displays the enlarged information of the first information, the enlarged information display unit may further display the enlarged information or the second information display unit and the enlarged information display unit may switch the second information with the enlarged information so as to display the enlarged information and the enlarged information display unit may change the display range of the enlarged information such that the display range corresponds to the selection range selected by the range selection unit.

(6) The display device described in (5) may further include a range change unit (for example, a range change unit 25 which will be described later) that changes at least any one of the display range of the second information and the display range of the enlarged information, and the range selection unit may change the selection range such that the selection range corresponds to the display range of the second information or the display range of the enlarged information which is changed by the range change unit.

(7) The display device described in (3) may further include an enlarged information display unit (for example, an enlarged information display unit 34 which will be described later) that displays the enlarged information of the first information, the enlarged information display unit may further display the enlarged information or the second information display unit, the third information display unit and the enlarged information display unit may switch the second information or the third information with the enlarged information so as to display the enlarged information and the enlarged information display unit may change the display range of the enlarged information such that the display range corresponds to the selection range selected by the range selection unit.

(8) The display device described in (7) may further include a range change unit (for example, a range change unit 25 which will be described later) that changes at least any one of the display range of the second information, the display range of the third information and the display range of the enlarged information, and the range selection unit may change the selection range such that the selection range corresponds to the display range of the second information, the display range of the third information or the display range of the enlarged information which is changed by the range change unit.

According to the present invention, it is possible to provide a display device with which an operator can visually and easily determine whether or not chips can be shredded in swinging cutting.

BRIEF DESCRIPTION OF THE DRAWINGS

FIG. 1 is a diagram showing a machining system which includes a display device according to the present embodiment;

FIG. 3 is a diagram showing an example of second information displayed by a second information display unit in the display device shown in FIG. 1;

DETAILED DESCRIPTION OF THE INVENTION

Figure 2A:
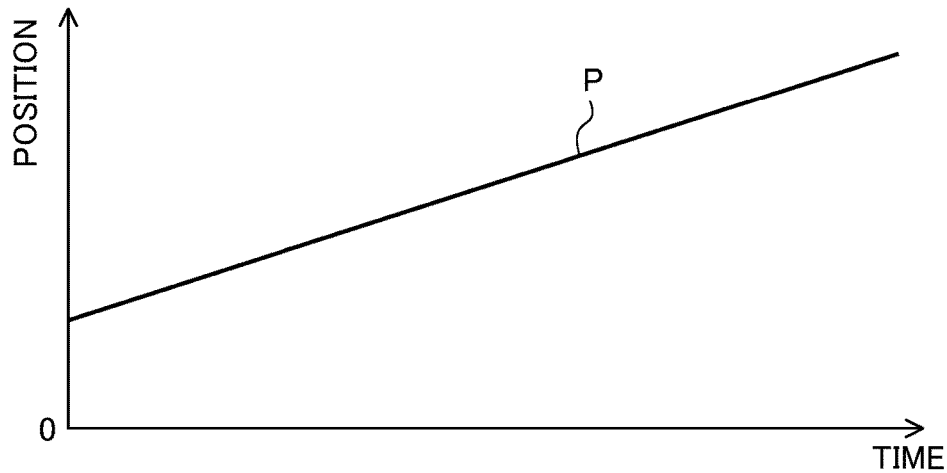
FIG. 2A is a diagram showing a position command for feed axes which is calculated by a controller shown in FIG. 1.

An example of the embodiment of the present invention will be described below with reference to accompanying drawings. In the drawings, the same or corresponding parts are identified with the same reference numerals.

FIG. 1 is a diagram showing a machining system which includes a display device according to the present embodiment. The machining system 1 shown in FIG. 1 includes a machine tool 10, a controller 11 which controls the machine tool 10 and the display device 20.

The machine tool 10 includes a cutting tool 14, for example, a byte (tool bit). The cutting tool 14 performs machining on a workpiece which has, for example, a tubular shape, a cylindrical shape, a conical shape or a truncated conical shape. The shape of the workpiece W may be a shape other than a cylindrical shape, and the machine tool 10 is not limited to a machine tool which performs machining and may be a machine tool which performs grinding, polishing or the like. However, in the following description, as shown in FIG. 1, it is assumed that, with the cutting tool 14, turning is performed on the outer circumferential surface of the workpiece W which is rotated and cylindrical. A description will be given using, as an example, a configuration in which the workpiece W is rotated and in which the cutting tool 14 swings along the generatrix of the outer circumferential surface of the workpiece W.

The machine tool 10 includes a plurality of drive axes 13. The individual drive axes 13 are controlled by the controller 11 such as a CNC (Computer Numerical Controller) or a PLC (Programmable Logic Controller). Although FIG. 1 shows the machine tool 10 which includes three drive axes 13, the number of drive axes 13 is not limited, and the machine tool 10 can include a necessary number of drive axes. The drive axes 13 include a spindle M0 and at least two feed axes M1 and M2 which perform a coordinated operation with the spindle M0. The spindle M0 includes a spindle motor or a servo motor. The feed axes M1 and M2 include a ball screw mechanism or a feed mechanism such as a linear slider and a servo motor which drives the feed mechanism.

In FIG. 1, it is assumed that the center axis line of the workpiece serving as the rotation axis of the workpiece W is a Z axis and that an axis line perpendicular to the Z axis is an X axis. Furthermore, the spindle M0 rotates the workpiece W about the center axis line (Z axis) of the workpiece. The feed axis Ml can both feed the cutting tool 14 in a first direction (hereinafter referred to as the direction of machining) along the direction of the Z axis and reciprocate the cutting tool 14 in the first direction, that is, make the cutting tool 14 swing. The feed axis M2 can both feed the cutting tool 14 in a second direction (hereinafter referred to as the direction of cutting) along the direction of the X axis and reciprocate the cutting tool 14 in the second direction, that is, make the cutting tool 14 swing. When the turning is performed on the workpiece which has a cylindrical shape or a tubular shape, the workpiece is rotated about the center axis line (Z axis) of the workpiece, and the cutting tool 14 is fed in only the first direction (the direction of the machining) along the direction of the Z axis. In this case, the feed axis M2 is basically unnecessary.

When the turning is performed on the workpiece, such as a workpiece having a conical shape, a truncated conical shape or the like, whose outside diameter differs in the direction of the Z axis, the workpiece W is rotated about the center axis line (Z axis) of the workpiece, and the cutting tool 14 is fed in the combined direction of the direction of the X axis and the direction of the Z axis. In this case, in order to feed the cutting tool 14 along the generatrix of the outer circumferential surface of the workpiece W in an oblique direction, at least two feed axes M1 and M2 are needed. Both the feed axis M1 and the feed axis M2 are controlled, and thus the cutting tool 14 is fed along the generatrix of the outer circumferential surface of the workpiece W in the oblique direction.

In the controller 11, a machining program (NC program) which can set machining conditions such as a spindle revolution number (S) and a feedrate (F) and various types of parameters is produced and stored. The controller 11 includes an operator's panel (not shown) with which the machining conditions and the various types of parameters set in the machining program can be changed.

The controller 11 can calculate, according to the machining program, commands for individually operating the drive axes 13 such as the spindle M0, the feed axis M1 and the feed axis M2 and transmit the calculated commands to the corresponding drive axes 13 such as the spindle M0, the feed axis M1 and the feed axis M2. In a configuration in which as in the example of FIG. 1, the workpiece W is rotated with the spindle M0 and in which the cutting tool 14 is fed with the feed axes M1, M2 and the like, the controller 11 transmits a command for a predetermined rotation speed to the spindle M0 and transmits a command for a predetermined target position to the feed axes M1, M2 and the lite.

The machining system 1 includes, for each of the drive axes 13 such as the spindle M0, the feed axis M1 and the feed axis M2, a position detection device 15 which detects the position of the drive axis 13. In particular, as shown in FIG. 1, in the configuration in which the workpiece W is rotated with the spindle M0, as the position detection device 15 of the spindle M0, a sensor which can detect the rotation position (angle) of the workpiece W, for example, a rotary encoder can be used. The rotary encoder can also detect the rotation speed of the workpiece w. As the position detection device 15 of the feed axis M1 shown in FIG. 1, a sensor which can detect the position of the cutting tool 14 in the direction of the machining of the workpiece W, for example, an encoder can be used. As the position detection device 15 of the feed axis M2, a sensor which can detect the position of the cutting tool 14 in the direction of the cutting described above, for example, an encoder can be used. However, as long as the position detection devices 15 of the feed axes M1 and M2 can acquire the positions (the position of the cutting tool 14 in the example of FIG. 1) of the feed axes M1 and M2, any device may be used, and they are not limited to the encoder described above. The position detection devices 15 of the feed axes M1 and M2 may be, for example, a position measuring device which is arranged apart from the drive axis 13 and which includes a laser tracker, a three-dimensional position sensor or the like. The controller 11 controls the drive axes 13 such that the commands transmitted to the drive axes 13 as described previously agree with the position data of the drive axes 13 fed back from the position detection devices 15 of the drive axes 13 to the controller 11.

Furthermore, in order to shred chips generated by the turning, the controller 11 has the function of controlling the feed axis M1 such that the cutting tool 14 and the workpiece W are made to relatively swing in the first direction (the direction of the machining) described previously so as to perform intermittent cutting. A feed command of the feed axis M1 for performing the intermittent cutting as described above is also calculated by the controller 11 according to the machining program. An operator uses the operator's panel (not shown) of the controller 11 so as to change the machining conditions and the various types of parameters, and thereby can determine the frequency, the amplitude and the like of the feed command for the intermittent cutting. The intermittent cutting described above means that machining is performed on the workpiece W while the cutting tool 14 is periodically brought into contact with the workpiece W and separated from the workpiece W, and is also referred to as swinging cutting or vibration cutting.

The feed command for the intermittent cutting described above is calculated by, for example, the following method. The controller 11 first calculates a position command for the feed axis M1 on feeding in the first direction (the direction of the machining) along the direction of the Z axis in FIG. 1 based on a machining start point, a machining end point, the rotation speed of the spindle M0 (the rotation speed of the workpiece W in the example of FIG. 1), the feedrate by the feed axis M1 (the feedrate of the cutting tool 14 in the example of FIG. 1) and the like which are set in the machining program. Then, the controller 11 calculates, based on the rotation speed, the feedrate and the various types of parameters described above, the swinging command of the feed axis Ml for producing the swinging (reciprocating movement) of the cutting tool 14 in the direction of the machining described above. Furthermore, the controller 11 adds the position command and the swinging command together so as to calculate the feed command (combination command) for the intermittent cutting described above.

Figure 2B:
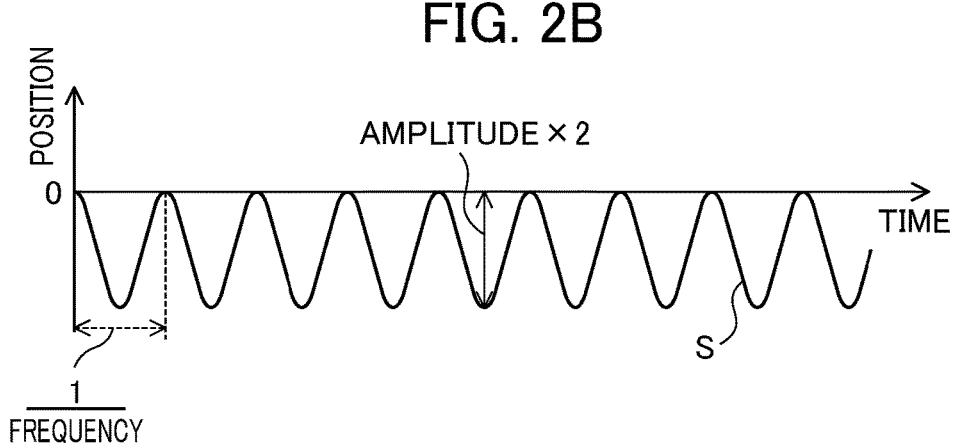
FIG. 2B is a diagram showing a swinging command for the feed axes which is calculated by the controller shown in FIG. 1.
Figure 2C:
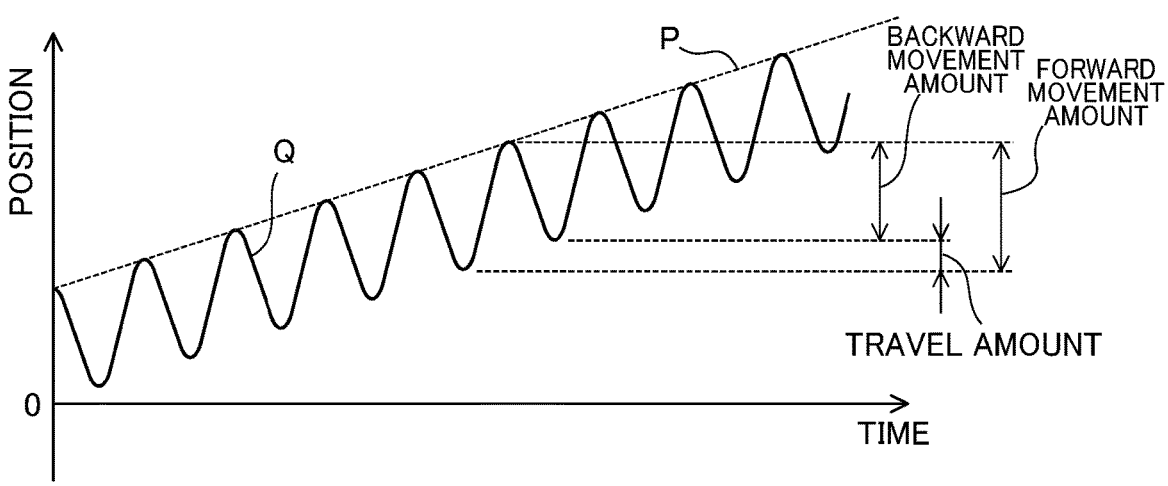
FIG. 2C is a diagram showing a feed command obtained by adding the swinging command shown in FIG. 2B to the position command shown in FIG. 2A.

Here, FIG. 2A is a diagram showing the position command described above, a horizontal axis represents time and a vertical axis represents a position (position command value) in the direction of the machining. In the position command, as time passes, the position command value of the feed axis M1 is linearly increased (see a straight line P). FIG. 2B is a diagram showing the swinging command described above, a horizontal axis represents time and a vertical axis represents a position (position command value) in the direction of the machining. In the swinging command, as time passes, the position command value of the feed axis M1 is periodically increased and decreased (see a wavy curve S). As is found from FIG. 2B, the amplitude and the frequency in the swinging command are changeable, and thus it is possible to obtain the swinging commands of various vibration waveforms. In this example, the rotation speed of the workpiece W and the feedrate of the cutting tool 14 are individually set constant, and thus the frequency and the amplitude of the swinging command are constant even though time passes. FIG. 2C is a diagram showing a feed command (combination command) which is obtained by adding the swinging command shown in FIG. 2B to the position command shown in FIG. 2A, a horizontal axis represents time and a vertical axis represents a position (position command value) in the direction of the machining. The path of the cutting tool 14 follows the feed command shown in FIG. 2C. More specifically, as shown in FIG. 2C, by the feed command (see a wavy curve Q), in one round of the reciprocating movement, the cutting tool 14 is moved backward by only a predetermined backward movement amount and is then moved forward by only a predetermined forward movement amount so as to be moved by only a travel amount which is a difference therebetween. As described above, in the present embodiment, by the feed axis M1, the cutting tool 14 is fed in the direction of the machining while being reciprocated (made to swing) in the direction of the machining, and thus the intermittent cutting is performed.

The swinging command described above is a cosine wave-shaped command indicated by the wavy curve S in FIG. 2B, and is defined as a formula below.

swinging command=$(K*F/2) \times \cos(2\pi \times S/60 \times I \times t) - (K \times F/2)$    formula (1)

In formula (1), K represents a swinging amplitude magnification, F represents the amount of movement of the cutting tool 14 per revolution of the workpiece W, that is, a feed amount per revolution [mm/rev], S represents the rotation speed of the workpiece w about the center axis line [$\min^{-1}$] or [rpm] and I represents a swinging frequency magnification. Here, the swinging frequency, that is, the frequency of the swinging command corresponds to a term of (S/60×I) in formula (1), and the swinging amplitude, that is, the amplitude of the swinging command corresponds to a term of (K×F/2) in formula (1). However, the swinging amplitude magnification K is a number equal to or greater than one, and the swinging frequency magnification I is a non-integer greater than zero (for example, a positive non-integer such as 0.5, 0.8, 1.2, 1.5, 1.9, 2.3 or 2.5, . . . ). The swinging amplitude magnification K and the swinging frequency magnification I are constants.

In formula (1) described above, the swinging command is a command in which the term of (K×F/2) is subtracted as an offset value with respect to a cosine wave where the position of zero is a reference axis line. Hence, the feed command (the wavy curve Q in FIG. 2C) obtained by adding the swinging command to the position command is a command which does not exceed the position command (the straight line in FIG. 2C) in the direction of the machining. Thus, the path of the position of the cutting tool 14 based on the feed command (the wavy curve Q) can be controlled with the assumption that, in the direction of the machining of the cutting tool 14, the position according to the position command is an upper limit. Furthermore, the swinging command of the cosine wave as indicated by formula (1) is provided, and thus as is found from the wavy curve Q in FIG. 2C, large swinging is prevented from being produced at the machining start point (position of 0° in the horizontal axis) of the cutting tool 14 in the direction of the feeding of the cutting tool 14 from the beginning. The reason why the swinging frequency magnification I is not set to an integer is that in the case of a swinging frequency which is exactly equal to the number of revolutions of the workpiece W about the center axis line, overlapping parts B1, B2 and the like (see FIG. 3) as described later cannot be produced, and that thus it is impossible to obtain the effect of shredding chips by swinging cutting.

It is assumed that formula (1) described above is described in the machining program within the controller 11. The operator's panel (not shown) of the machine tool 10 can provide the values of the swinging amplitude magnification K and the swinging frequency magnification T to formula (1) described in the machining program within the controller 11. It is assumed that the rotation speed S [$\min^{-1}$] of the workpiece W and the feedrate [mm/min] of the cutting tool 14 are previously set, as machining conditions, in the machining program within the controller 11. The controller 11 calculates the feed amount per revolution F (=feedrate/rotation speed S) in formula (1) described above from the feedrate and the rotation speed as described above, and can calculate the swinging command by formula (3) described above to which the values of the swinging amplitude magnification K and the swinging frequency magnification I are previously provided.

The machining system 1 of the present embodiment includes the display device 20 which displays information on the machine tool 10 when in order to shred chips generated in the turning, the cutting tool 14 and the workpiece W are made to relatively swing in the direction of the machining so as to perform the intermittent cutting. As described previously, the feed command of the feed axis Ml for performing the intermittent cutting is calculated by the controller 11, and the display device 20 is a device which makes the operator visually recognize the feed command as described above and the actual position of the feed axis M1 driven by the feed command. However, in a method of simply displaying, on a display screen, the command value of the feed command for the intermittent cutting, it is difficult for the operator to determine whether or not the chips can be shredded with the cutting tool 14. Even in a method of detecting, with the position detection device 15, the actual position of the feed axis M1 driven by the feed command for the intermittent cutting so as to display the detection value thereof on the display screen, it is difficult for the operator to determine, from the display screen, whether or not the chips can be shredded.

Hence, as shown in FIG. 1, the display device 20 of the present embodiment includes an information acquisition unit 21, a range selection unit 23, a range change unit 25 and a display unit 30.

Although in the configuration example shown in FIG. 1, the display device 20 is arranged outside and away from the controller 11, the display device 20 may be provided in the operator's panel (not shown) of the machine tool 10 or may be provided integrally with the controller 11. The display unit 30 can be a display panel unit such as an LCD (Liquid crystal display) panel or an OLED (Organic light emitting diode) panel.

The information acquisition unit 21 acquires, at regular time intervals, the position information of the feed axes M1 and M2 when the intermittent cutting is performed. The regular time interval can be set to an integer multiple of the sampling control period (for example, the distribution period of command pulses) of the controller 11. The position information acquired by the information acquisition unit 21 is either the value of the feed command for the intermittent cutting or the actual positions (position feedback) of the feed axes M1 and M2 driven by the feed command. Furthermore, when the actual positions of the feed axes M1 and M2 are acquired as the position information of the feed axes M1 and M2, the actual positions may be the output values of the encoders included in the servo motors of the feed axes M1 and M2 or the positions of the movement ends of the feed axes M1 and M2, for example, the position of the tip end portion of the cutting tool 14, which are remotely measured with the position measuring device such as a laser tracker or a three-dimensional position sensor.

The information acquisition unit 21 acquires, at regular time intervals, control information other than the position information of the feed axes M1 and M2 when the intermittent cutting is performed, for example, torque information, speed information or acceleration information. The torque information, the speed information and the acceleration information acquired by the information acquisition unit 21 may be feed command values for the intermittent cutting or feedback values of the feed axes M1 and M2 driven by the feed command. Actual torque (torque feedback) may be determined, for example, by detecting drive currents for the servo motors of the feed axes M1 and M2. Actual speed (speed feedback) may be determined, for example, from the output values of the encoders included in the servo motors of the feed axes Ml and M2. Actual acceleration (acceleration feedback) may be determined, for example, from the output value of an acceleration sensor provided at the tip end portion of the cutting tool 14.

The information acquisition unit 21 acquires, as rotation information, the relative rotation speeds and rotation angles of the workpiece W and the cutting tool 14. In the case of the configuration shown in FIG. 1, in the machining program stored in the controller 11, the rotation speed of the spindle M0 (the rotation speed of the workpiece W) is previously set, and the information acquisition unit 21 acquires, as the rotation information, the rotation speed of the spindle M0 from the controller 11. Furthermore, as described previously, as the position detection device 15 of the spindle M0, the rotary encoder is used, and, during the intermittent cutting, the controller 11 can detect the rotation angle of the spindle M0 with the rotary encoder. Hence, the information acquisition unit 21 can acquire, as the rotation information, not only the rotation speed but also the rotation angle of the spindle M0 from the controller 11. The information acquisition unit 21 also has the function of storing, in a memory (not shown), the acquired chronological position information of the feed axes M1 and M2, the other control information (the torque information, the speed information or the acceleration information), and the rotation speed and the rotation angle of the spindle M0.

The display unit 30 displays the information acquired by the information acquisition unit 21. The display unit 30 includes a first information display unit 31, a second information display unit 32, a third information display unit 33 and an enlarged information display unit 34. The first information display unit 31 displays first information that indicates a position to which the cutting tool 14 is relatively fed with respect to the workpiece W. Specifically, the first information display unit 31 displays, based on the chronological position information of the feed axes M1 and M2 acquired by the information acquisition unit 21, the first information indicating the movement route (movement path) of the feed axes M1 and M2, that is, the movement route (movement path) of the cutting tool 14. The enlarged information display unit 34 displays the enlarged information of the first information. However, the first information displayed may be the output values of the encoders incorporated in the servo motors of the feed axes M1 and M2 or the position of the tip end portion of the cutting tool 14 which is remotely measured with the position measuring device. In other words, the first information may be data based on the position command value for the feed axis M1 or data based on the actual positions (position feedback) of the feed axes M1 and M2.

The third information display unit 33 displays third information which indicates a chronological change of the position information of the feed axes M1 and M2. Specifically, the third information display unit 33 displays, based on the chronological position information of the feed axes M1 and M2 acquired by the information acquisition unit 21, the third information indicating the chronological change of the positions of the feed axes M1 and M2. For example, when the feed command for the intermittent cutting is acquired by the information acquisition unit 21, the wavy curve Q as shown in FIG. 2C corresponds to the third information. However, the third information displayed may be information which is obtained by associating the output values of the encoders incorporated in the servo motors of the feed axes M1 and M2 with time or information which is obtained by associating the position of the tip end of the cutting tool 14 remotely measured with the position measuring device with time. In other words, the third information may be data based on the position command values for the feed axes M1 and M2 or waveform data based on the actual positions of the feed axes M1 and M2.

The third information display unit 33 also displays the third information indicating a chronological change of the control information (the torque, the speed or the acceleration) of the feed axes M1 and M2 based on the chronological control information other than the position information of the feed axes M1 and M2 acquired by the information acquisition unit 21, for example, the chronological torque information, the chronological speed information or the chronological acceleration information. The third information may be data based on the command values of the torques, the speeds or the accelerations for the feed axes M1 and M2 or may be waveform data based on the actual torques (torque feedback), the actual speeds (speed feedback) or the actual accelerations (acceleration feedback) of the feed axes M1 and M2.

The second information display unit 32 displays second information indicating a relationship between the phase of the spindle M0 and the positions of the feed axes M1 and M2. Specifically, the second information display unit 32 displays, based on the chronological position information of the feed axes M1 and M2 and the rotation information of the spindle M0 acquired by the information acquisition unit 21, the second information in which the positions of the feed axes M1 and M2 are superimposed (returned) per revolution (or two revolutions, three revolutions, . . . ) of the spindle M0 and are displayed. For example, the second information display unit 32 displays the second information by dividing the third information displayed by the third information display unit 33 into pieces of partial data per rotation angle (360° or 2π) corresponding to one revolution of the spindle M0 (or rotation angles corresponding to a plurality of revolutions (two revolutions, three revolutions, . . . )) and sequentially shifting the pieces of partial data such that the pieces of partial data coincide with the start point (for example, an origin on the horizontal axis of FIG. 3) of the third information.

The rotation angle of the workpiece W may be calculated from the rotation speed which is a setting value set in the machining program within the controller 11 or the rotation angle of the workpiece W may be actually detected from the encoder incorporated in the spindle M0. The display device 20 may perform, at the same regular time intervals, the detection of the rotation angle of the workpiece W and the acquisition of the position information of the feed axes M1 and M2 described above so as to display the second information in which the actual rotation angles and the position information of the feed axes M1 and M2 are associated with each other.

FIG. 3 is a diagram showing an example of the second information displayed by the second information display unit 32. A horizontal axis in FIG. 3 represents the rotation angle (that is, the phase) of the spindle M0, and a vertical axis represents positions (that is, the positions of the feed axes M1 and M2) in the direction of the machining (that is, the first direction along the direction of the Z axis in FIG. 1). A curve A1 and a curve A2 shown in FIG. 3 correspond to, for example, the pieces of partial data obtained by dividing the chronological data (the wavy curve Q) of the feed command shown in FIG. 2C per revolution of the workpiece W, that is, the second information. The curve A1 indicates the second information in the first revolution of the workpiece W, and the curve A2 indicates the second information in the second revolution of the workpiece W. For simplification, the illustration of the second information in the third and subsequent revolutions of the workpiece W is omitted. The second information of the curves A1 and A2 and the like indicates the path of the cutting tool 14 on the workpiece W which is rotated. In FIG. 3, a plurality of linear broken lines C1, C2, C3, . . . which are obliquely extended are shown. The broken lines C1, C2 and C3 correspond to the position command (the dotted straight line P) shown in FIG. 2C, and the intervals between the broken lines C1, C2 and C3 in the direction of the vertical axis in FIG. 3 correspond to the feed amount per revolution F.

In FIG. 3, the curve A1 and the curve A2 overlap each other in the two parts B1 and B2. In the parts B1 and B2, the maximum value of the curve A1 with respect to the broken line C1 is larger than the minimum value of the curve A2 with respect to the broken line C2. In the overlapping parts B1 and B2, when the cutting tool 14 performs the machining along the path of the curve A2, the cutting tool 14 is separated from the workpiece W, with the result that the workpiece W is not machined. The overlapping parts B1 and B2 as described above are periodically produced, and thus the intermittent cutting described previously is realized. In an example shown in FIG. 3, chips are individually generated in the overlapping parts B1 and B2 by the operation corresponding to the curve A2. In other words, in the curve A2 of the second revolution, the two chips are generated.

Hence, the operator checks the presence of the overlapping parts B1 and B2 in which the previous curve A1 and the subsequent curve A2 overlap each other, and thereby can determine whether or not chips can be shredded. When the overlapping parts B1, B2 and the like are not produced, the operator changes the swinging frequency and the swinging amplitude in the swinging command shown in FIG. 2B. This change can be performed by adjusting the setting values such as a spindle rotation speed S, the feed amount per revolution F and the swinging frequency magnification I in the machining program within the controller 11. In order to produce the intended overlapping parts B1 and B2, the operator preferably changes the swinging frequency and the swinging amplitude while visually recognizing the second information displayed on the display unit 30 of the display device 20 which will be described later.

The display unit 30 configured as described above displays the first information and the second information. Specifically, the first information display unit 31 displays the first information, and the second information display unit 32 displays the second information. Here, the second information display unit 32 changes the display range of the second information such that the display range corresponds to a selection range selected by the range selection unit 23 which will be described later. The display unit 30 may further display at least one of the enlarged information of the first information and the third information. Specifically, the enlarged information display unit 34 may further display the enlarged information of the first information, and the third information display unit 33 may further display the third information. Alternatively, the display unit 30 may temporarily switch the second information with at least one of the enlarged information of the first information and the third information so as to produce a display. Specifically, the second information display unit 32 and the enlarged information display unit 34 may switch the second information with the enlarged information so as to display the enlarged information or the second information display unit 32 and the third information display unit 33 may switch the second information with the third information so as to display the third information. Alternatively, the second information display unit 32, the third information display unit 33 and the enlarged information display unit 34 may switch the second information or the third information with the enlarged information so as to display the enlarged information. Here, the enlarged information display unit 34 may change the display range of the enlarged information such that the display range corresponds to the selection range selected by the range selection unit 23, and the third information display unit 33 may change the display range of the third information such that the display range corresponds to the selection range selected by the range selection unit 23.

Figure 4:
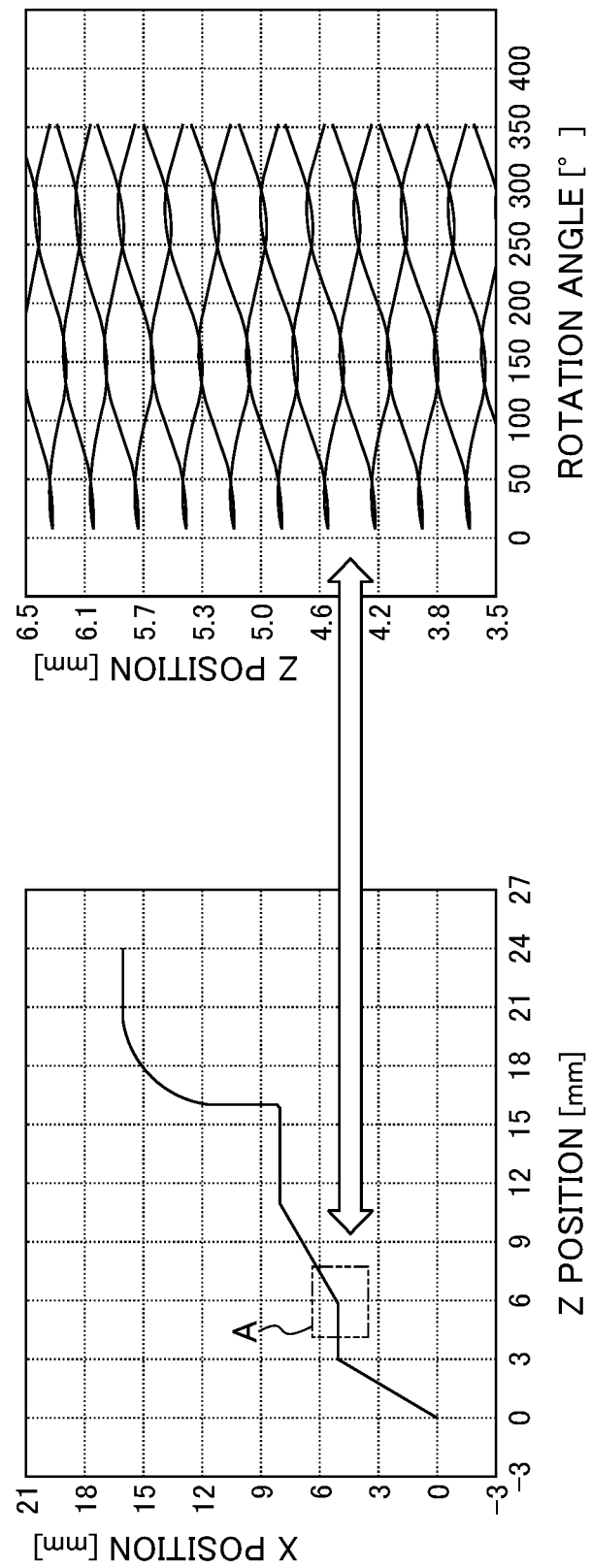
FIG. 4 is a diagram showing examples of displays of first information and the second information produced by display units in the display device shown in FIG. 1.
Figure 5:
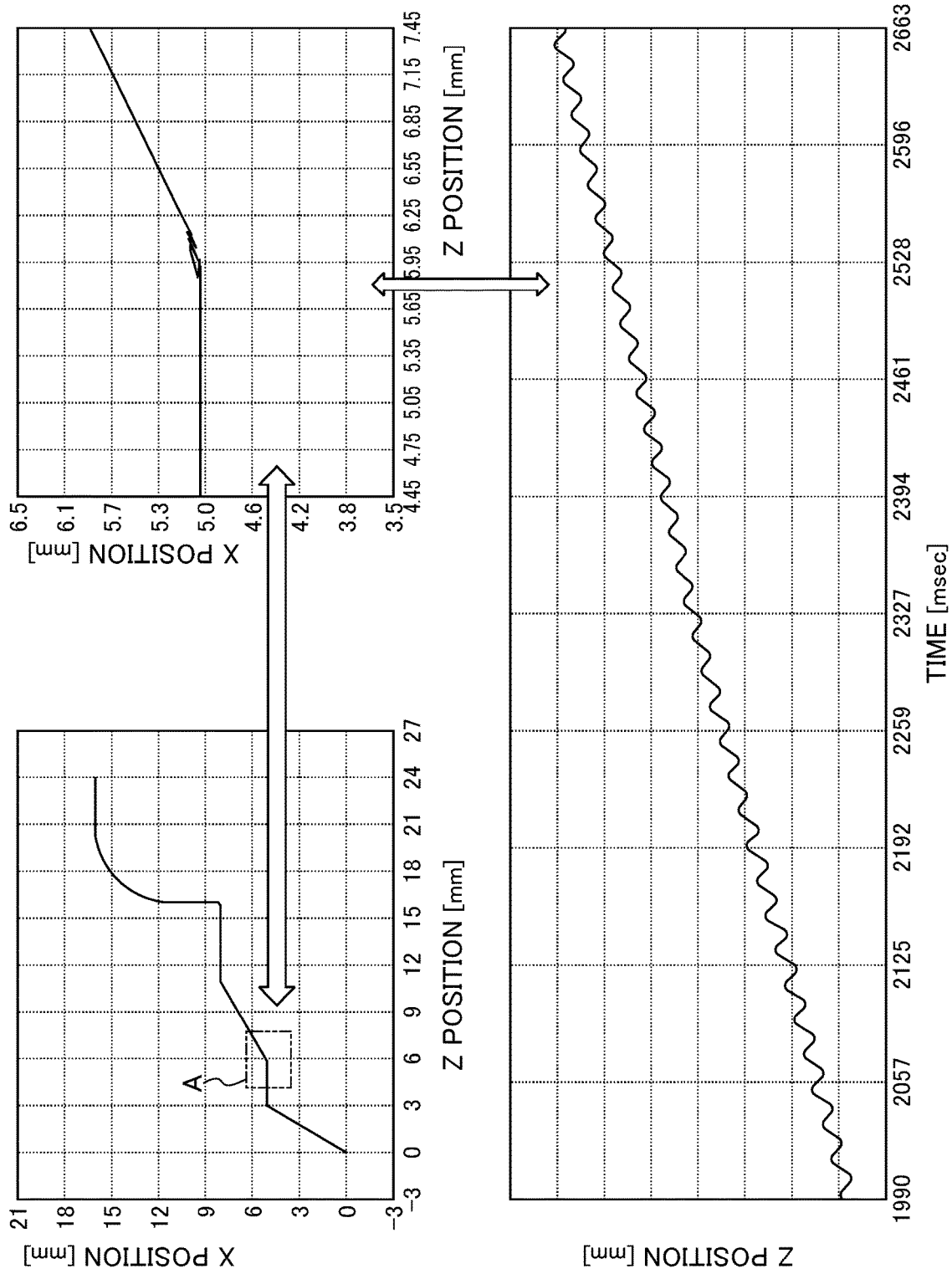
FIG. 5 is a diagram showing examples of displays of the first information, the enlarged information of the first information and third information produced by display units in the display device shown in FIG. 1.

FIG. 4 is a diagram showing examples of displays of the first information and the second information, and FIG. 5 is a diagram showing examples of displays of the first information, the enlarged information of the first information and the third information. In FIG. 4, the first information display unit 31 displays the first information, that is, the movement route (movement path) which is shown by the position (Z position in the direction of the machining) of the feed axis Ml and the position (X position in the direction of cutting) of the feed axis M2 (left figure), and the second information display unit 32 displays the second information, that is, information which is shown by superimposing the position (Z position in the direction of the machining) of the feed axis M1 per revolution of the spindle M0 (right figure). The first information display unit 31 may display a selection range A selected by the range selection unit 23 such that the selection range A corresponds to the first information (left figure). The second information (right figure) is information which corresponds to FIG. 3 described previously.

As described above, the second information, that is, the information which is shown by superimposing the position (Z position in the direction of the machining) of the feed axis M1 per revolution of the spindle M0 is displayed (right figure), and thus as described previously, the operator checks the presence of the overlapping parts of the curves in the second information, and thereby can easily determine whether or not chips can be shredded. The selection range A corresponding to the display range of the second information is displayed together with the first information, that is, the movement route (movement path) which is shown by the position (Z position in the direction of the machining) of the feed axis M1 and the position (X position in the direction of the cutting) of the feed axis M2 (left figure), and thus the operator can check which part of the second information in the movement route (movement path) is displayed.

The second information display unit 32 may display, as the second information, information which is shown by superimposing the position (X position in the direction of the cutting) of the feed axis M2 per revolution of the spindle M0 or information which is shown by superimposing a position in the combined direction of the direction of the machining of the feed axis M1 and the direction of the cutting of the feed axis M2 per revolution of the spindle M0.

On the other hand, in FIG. 5, the second information display unit 32 and the enlarged information display unit 34 temporarily switch the second information shown in FIG. 4 with the enlarged information of the first information, that is, the enlarged information of the first information whose display range is changed so as to correspond to the selection range A, and then produce a display (upper-right figure). Furthermore, the second information display unit 32 and the third information display unit 33 temporarily switch the second information shown in FIG. 4 with the third information, that is, information indicating a chronological change of the position (Z position in the direction of the machining) of the feed axis M1, and then produce a display (lower figure).

Here, in the enlarged information of the first information (upper-right figure), the curve corresponds to the generatrix of the outer circumferential surface of the workpiece W. In this way, the enlarged information of the first information is displayed, and thus the operator can check excessive cutting of the workpiece W, insufficient cutting thereof or the like. As the enlarged information of the first information or the third information, that is, the information indicating the chronological change of the position (Z position in the direction of the machining) of the feed axis M1, the position command value and the actual position (position feedback) are displayed so as to be superimposed (upper-right figure, lower figure), and thus the operator checks a displacement between the position command value and the actual position (position feedback) so as to be able to check whether or not the adjustment of the machine tool 10 and the controller 11 (for example, the adjustment of a servo parameter) is appropriate.

The third information display unit 33 may display, as the third information, the control information other than the positions of the feed axes M1 and M2, for example, information indicating a chronological change of the torques, the speeds or the accelerations. As described above, as the information indicating the chronological change of the torques, the speeds or the accelerations of the feed axes M1 and M2, the command values and the actual detection values (feedback) are displayed so as to be superimposed, and thus the operator checks a displacement between the command values and the actual detection values (feedback) so as to be able to check whether or not the adjustment of the machine tool 10 and the controller 11 (for example, the adjustment of the servo parameter) is appropriate.

The third information display unit 33 may display, as the third information, information indicating a chronological change of the position (X position in the direction of the cutting) of the feed axis M2 or information indicating a chronological change of the position in the combined direction of the direction of the machining of the feed axis M1 and the direction of the cutting of the feed axis M2.

Furthermore, when the second information and the third information are displayed, instead of the display methods indicated in FIGS. 4 and 5, time or the rotation angle may be indicated in the direction of the vertical axis, and the position command value of the feed axis or the actual position may be indicated in the direction of the horizontal axis.

The range selection unit 23 selects part of the first information as the selection range A. Here, the range change unit 25 changes at least any one of the display range of the second information, the display range of the third information and the display range of the enlarged information of the first information such that the changed display range corresponds to the selection range A selected by the range selection unit 23. For example, the range selection unit 23 may specify the start point and the end point of part of the first information so as to select the selection range. Here, the range change unit 25 changes the display scales of the vertical axes or the horizontal axes of the second information and the third information so as to display information equivalent to a time range corresponding to the selected selection range, with the result that the display range and the selection range may be synchronized. Since the first information, the second information and the third information are pieces of chronological information which are acquired by the information acquisition unit 21 at the same time, when the range selection unit 23 selects part of the first information as the selection range, the range change unit 25 can determine a time range corresponding to the selection range, and displays parts of the second information and the third information in this time range such that the display range of the first information can be made to correspond to the display range of the second information. In this way, for example, the third information display unit 33 extracts a time range corresponding to the selected first information so as to display the third information in the time range corresponding to the selection range, and changes the display range so as to display the third information in the time range, with the result that the selection range and the display range can be synchronized.

The range change unit 25 changes at least any one of the display range of the second information, the display range of the third information and the display range of the enlarged information of the first information. Here, the range selection unit 23 changes the selection range such that the selection range corresponds to the display range of the second information, the display range of the third information or the display range of the enlarged information of the first information which is changed by the range change unit 25.

The range selection unit 23 may include, for example, a touch panel which is provided in the display unit 30. In this way, the selection range selected in the range selection unit 23 is changed. Here, the display unit 30 changes, in a coordinated manner, the display range of the second information, the display range of the third information and the display range of the enlarged information of the first information such that the changed display ranges correspond to the changed selection range. For example, in FIG. 4, when the operator operates the touch panel so as to shift the selection range A corresponding to the first information, the display range of the second information is also shifted in a coordinated manner. For example, in FIG. 5, when the operator operates the touch panel so as to shift the selection range A corresponding to the first information, the display range of the enlarged information of the first information and the display range of the third information are also shifted in a coordinated manner. As described above, the changes of the selection range A of the first information, the display range of the second information, the display range of the third information and the display range of the enlarged information of the first information are performed in a coordinated manner, and thus the checking operation of the operator can be made easy.

The range change unit 25 may include, for example, a touch panel which is provided in the display unit 30. For example, in FIG. 4, when the operator operates the touch panel so as to vertically shift the display range of the second information, the selection range A corresponding to the first information is also laterally shifted in a coordinated manner. For example, in FIG. 5, when the operator operates the touch panel so as to shift the display range of the enlarged information of the first information or the display range of the third information, the selection range A corresponding to the first information is also shifted in a coordinated manner, and the display range of the enlarged information of the first information is shifted according to the shifted selection range A. As described above, the changes of the selection range A of the first information, the display range of the second information, the display range of the third information and the display range of the enlarged information of the first information are performed in a coordinated manner, and thus the checking operation of the operator can be made easy.

As described above, with the display device 20 of the present embodiment, the operator can easily determine whether or not the chips can be shredded in the intermittent cutting (swinging cutting). In this way, the operator can more reliably adjust the swinging amplitude in order to shred the chips, and thus it is possible to realize the intermittent cutting in which the chips are shredded as intended.

When a backlash is provided in the drive mechanism unit of the cutting tool 14 or the rigidity of the drive mechanism unit is low, it is likely that vibrations occur during the intermittent cutting and that thus the accuracy of the position of the cutting tool 14 is not stabilized. For example it is likely that, even when the feed axis M1 is driven based on the feed command for the intermittent cutting, the actual position of the cutting tool 14 does not completely follow the curves A1 and A2 as shown in FIG. 3. In other words, even when the command value is regarded such that the chips can be shredded, in actuality, it is likely that the chips are not shredded as intended. In this regard, the display device 20 of the present embodiment detects a chronological change of the actual position of the feed axis M1 with the position detection device 15 such as an encoder, and the second information described previously is generated based on the detection data and can be displayed on the display unit 30. Hence, the operator sees the second information based on the actual positions of the feed axes M1 and M2 as described above, and thereby can accurately determine whether or not the chips are actually shredded.

When the turning is performed on the cylindrical workpiece W, the rotation speed S of the workpiece W is preferably constant. On the other hand, when the turning is performed on the workpiece W having a conical shape, a truncated conical shape or the like, the diameter of part of the workpiece with which the tip end of the cutting tool 14 makes contact is changed according to the feed position of the cutting tool 14 in the direction of the machining (the direction along the direction of the 2 axis in FIG. 1). In this case, when the rotation speed S of the workpiece W is constant, the surface speed (that is, the cutting speed) of the part of the workpiece W with which the cutting tool 14 makes contact changes according to the position of the cutting tool 14 in the direction of the machining, and thus it is likely that a uniform machined surface cannot be obtained.

Hence, in order for the surface speed to be made constant, the rotation speed S of the workpiece W may be determined by a function that changes according to the diameter of the part of the workpiece with which the tip end of the cutting tool 14 makes contact.

The controller 11 and the display device 20 described above are formed with a computer that includes a memory such as a ROM (read only memory) and a RAM (random access memory), a CPU (control processing unit) and a communication control unit which are connected to each other through a bus. Furthermore, individual function units such as the information acquisition unit 21, the first information display unit 31, the second information display unit 32, the third information display unit 33 and the enlarged information display unit 34 which form the display device 20 can be achieved by the coordination of the CPU and the memory incorporated in the computer and a control program stored in the memory.

Although the embodiment of the present invention is described above, the present invention is not limited to the embodiment described above, and various modifications and variations are possible. For example, although in the embodiment described above, the configuration in which the workpiece W is rotated and in which the cutting tool 14 swings along the generatrix of the outer circumferential surface of the workpiece W is illustrated, the present invention is not limited to this configuration. The machine tool according to the present invention may have a configuration in which the spindle M0 that relatively rotates the workpiece W and the cutting tool 14 about the center axis line of the workpiece W and at least one of the feed axes M1, M2 that relatively feed the workpiece W and the cutting tool 14 in the direction of the machining along the center axis line and the like are controlled, and in which thus the turning is performed on the workpiece W. For example, a configuration in which the cutting tool 14 is rotated about the center axis line of the workpiece W and in which the workpiece W swings with respect to the cutting tool 14 or a configuration in which the workpiece W is rotated and in which the workpiece W swings with respect to the cutting tool 14 in a direction along the generatrix of the outer circumferential surface of the workpiece W can be assumed. In the present invention, a machining method in which the cutting tool 14 is rotated about the center axis line of the workpiece W so as to perform cutting on the workpiece W is assumed to be one type of turning.

EXPLANATION OF REFERENCE NUMERALS

1 machining system
10 machine tool
11 controller
13 drive axis
14 cutting tool
15 position detection device
20 display device
21 information acquisition unit
23 range selection unit
25 range change unit
30 display unit
31 first information display unit
32 second information display unit
33 third information display unit
34 enlarged information display unit
M0 spindle
M1, M2 feed axis
W workpiece

What is claimed is:

1. A display device which acquires and displays information on a machine tool that includes a spindle for relatively rotating a workpiece and a cutting tool and at least one feed axis for relatively feeding the workpiece and the cutting tool and that performs machining on the workpiece while making the cutting tool and the workpiece swing relatively, the display device comprising:
    a first information display unit that displays first information indicating a position to which the cutting tool is relatively fed with respect to the workpiece;
    a second information display unit that displays second information indicating a relationship between a phase of the spindle and a position of the feed axis; and
    a range selection unit that selects part of the first information as a selection range,
    wherein the second information display unit changes a display range of the second information such that the display range corresponds to the selection range selected by the range selection unit.

2. The display device according to claim 1, further comprising: a range change unit that changes the display range of the second information,
    wherein the range selection unit changes the selection range such that the selection range corresponds to the display range of the second information which is changed by the range change unit.

3. The display device according to claim 1, further comprising: a third information display unit that displays third information indicating a chronological change of position information, torque information, speed information or acceleration information of the feed axis,
    wherein the third information display unit further displays the third information or the second information display unit and the third information display unit switch the second information with the third information so as to display the third information, and
    the third information display unit changes a display range of the third information such that the display range corresponds to the selection range selected by the range selection unit.

4. The display device according to claim 3, further comprising: a range change unit that changes at least any one of the display range of the second information and the display range of the third information,
    wherein the range selection unit changes the selection range such that the selection range corresponds to the display range of the second information or the display range of the third information which is changed by the range change unit.

5. The display device according to claim 1, further comprising: an enlarged information display unit that displays enlarged information of the first information,
    wherein the enlarged information display unit further displays the enlarged information or the second information display unit and the enlarged information display unit switch the second information with the enlarged information so as to display the enlarged information, and
    the enlarged information display unit changes a display range of the enlarged information such that the display range corresponds to the selection range selected by the range selection unit.

6. The display device according to claim 5, further comprising: a range change unit that changes at least any one of the display range of the second information and the display range of the enlarged information,
    wherein the range selection unit changes the selection range such that the selection range corresponds to the display range of the second information or the display range of the enlarged information which is changed by the range change unit.

7. The display device according to claim 3, further comprising: an enlarged information display unit that displays enlarged information of the first information,
    wherein the enlarged information display unit further displays the enlarged information or the second information display unit, the third information display unit and the enlarged information display unit switch the second information or the third information with the enlarged information so as to display the enlarged information, and
    the enlarged information display unit changes a display range of the enlarged information such that the display range corresponds to the selection range selected by the range selection unit.

8. The display device according to claim 7, further comprising: a range change unit that changes at least any one of the display range of the second information, the display range of the third information and the display range of the enlarged information,
    wherein the range selection unit changes the selection range such that the selection range corresponds to the display range of the second information, the display range of the third information or the display range of the enlarged information which is changed by the range change unit.

* * * * *